No. 727,268. PATENTED MAY 5, 1903.
K. V. BERGLUND.
AUTOMATIC WEIGHING APPARATUS.
APPLICATION FILED DEC. 2, 1901.
NO MODEL. 2 SHEETS—SHEET 1.
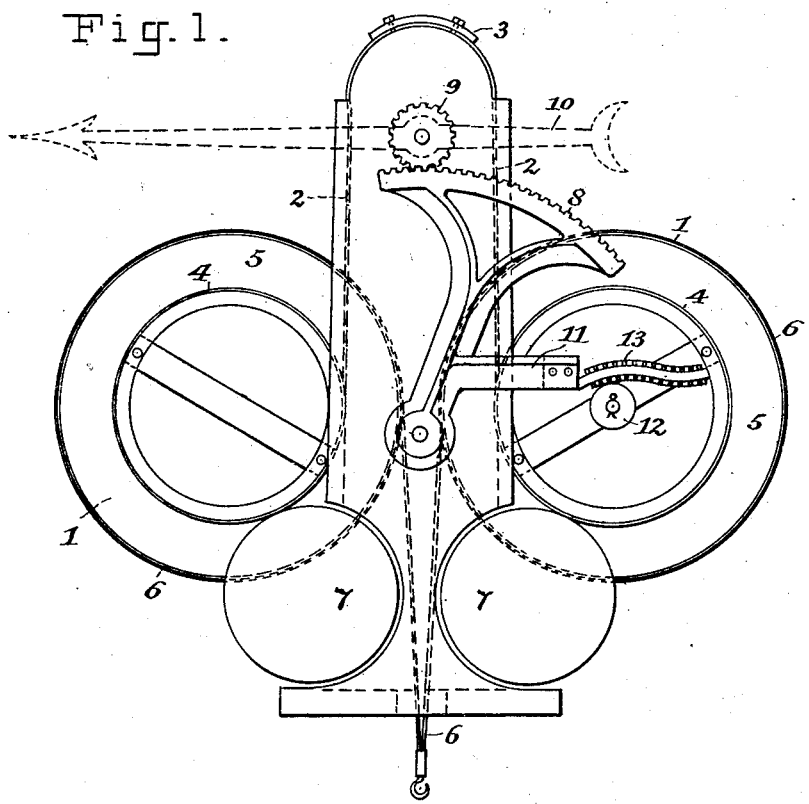
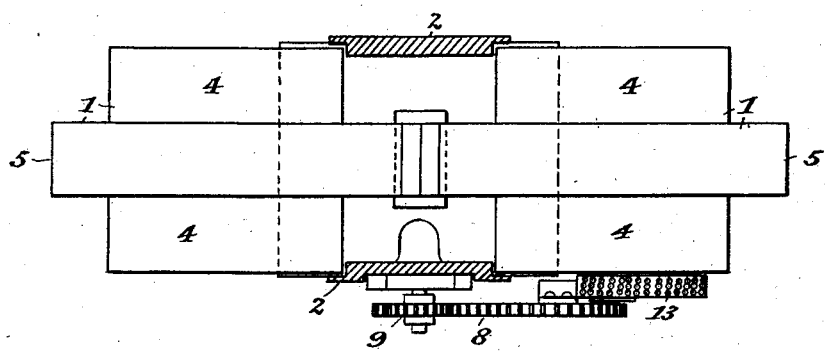
Witnesses.
E. B. Bolton
Isabella Waldron.
Inventor:
Karl Victor Berglund
By Richard
his Attorneys.

No. 727,268. PATENTED MAY 5, 1903.
K. V. BERGLUND.
AUTOMATIC WEIGHING APPARATUS.
APPLICATION FILED DEC. 2, 1901.
NO MODEL. 2 SHEETS—SHEET 2.
Fig. 6.
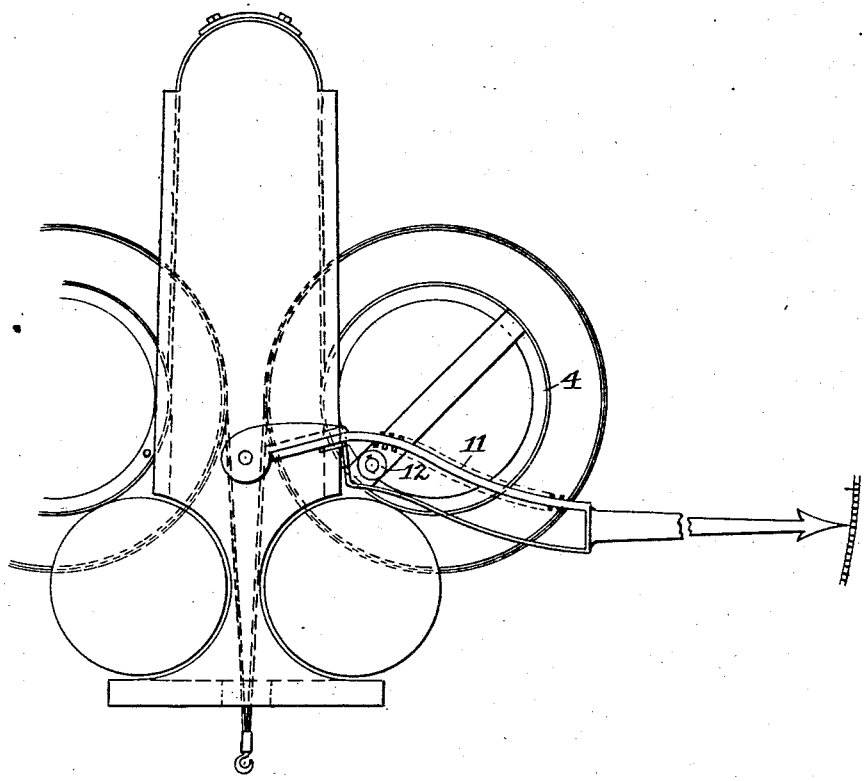
Fig. 3. Fig. 4.
 
Fig. 5.
Witnesses:
E. B. Botton
Isabella Waldron.
Inventor:
Karl Victor Berglund
By Richards
his Attorneys.

No. 727,268. Patented May 5, 1903.

UNITED STATES PATENT OFFICE.

KARL VICTOR BERGLUND, OF STOCKHOLM, SWEDEN, ASSIGNOR TO VÄG-FABRIKS AKTIEBOLAGET STATHMOS, OF STOCKHOLM, SWEDEN.

AUTOMATIC WEIGHING APPARATUS.

SPECIFICATION forming part of Letters Patent No. 727,268, dated May 5, 1903.

Application filed December 2, 1901. Serial No. 84,467. (No model.)

*To all whom it may concern:*

Be it known that I, KARL VICTOR BERGLUND, factory-manager, a subject of the King of Sweden and Norway, and a resident of Fabriksgränd 1, Stockholm, in the Kingdom of Sweden, have invented certain new and useful Improvements in Automatic Weighing Apparatus with Rolling Members, of which the following is a specification, reference being had therein to the accompanying drawings.

The weighing apparatus of this class hitherto used have a disadvantage in that a subsequent adjustment—for instance, when the weighing apparatus has been used for some time—cannot be performed as easily as desirable. In order to overcome this inconvenience, means are provided, according to this invention, by which the indicator-finger is not only made to move conformably to the indicator-dial determined for the type of weighing apparatus used, but also can be adjusted with regard to its movement at any part of the dial in case the finger should not point exactly right at a certain line of said dial. This is accomplished by having the roller upon which the band is wound or unwound act during its rolling against a lever or arm of a certain form, said arm actuating the indicator-finger.

In the accompanying drawings the main parts of the weighing mechanism are shown in Figure 1 in front elevation and in Fig. 2 in plan. Figs. 3 and 4 show a modification of the adjusting device attached to the arm or lever, which is viewed in Fig. 3 from the side and in Fig. 4 in cross-section. Fig. 5 is a modification. Fig. 6 is a front elevation of a modification.

The roller 1 bears upon the two vertical guides 2 2 and is adapted to roll along the same, said guides being connected at the top by means of the round cross-piece 3. Descending from the said cross-piece are steel bands wound upon the parts 4 4 of the roller. Wound upon the middle wider part 5 of the roller is another steel band 6, connected to the platform, so that when the apparatus is used the load acts upon the steel band 6. The roller is further provided with a counterweight 7. When there is no load upon the platform, the roller takes up such a position that the counterweight firmly connected to the roller is located beneath and to one side of the center thereof, as shown in the drawings, Fig. 1. In the form of carrying out the invention illustrated in the drawings there are rollers and bands at both sides of the uprights forming the guides 2, so that the mechanism is symmetrical with regard to these parts; but for smaller weighing apparatus it is sufficient to have only one roller at the one side. Pivoted to the upright is a toothed segment or cog-sector 8, engaging the pinion 9, and fastened to the axle of said pinion is an indicator-finger 10, the axle of the pinion and the finger going loosely through a graduated dial-plate. This plate is not shown in the drawings; but a number of small lines indicate the graduation. The cog-sector is provided with a lever or arm 11, upheld by an easily-movable roller 12, stud, or the like fastened to one end of the roller, 1 at the center thereof. When a load is placed upon the platform, the band 6 is drawn down and the roller 1 rolls upward along the guides 2 until by the increase of the moment of the outward-moving counterweight 7 an equilibrium is reached. At the same time the roller 12 acts upon the arm 11 and turns the cog-sector and the indicator-finger. A certain curve formed by the arm thus causes a certain movement of the indicator-finger, so that by a suitable selection of the curve the finger is made to move as desired—*i. e.*, conformably to the dial graduated in a manner most suitable for the purpose. Further, it is possible to adjust the irregularity or disproportion of the movement of the indicator-finger due to the fact that when the load is constantly increased the angular movement of the roller is small at the beginning of the movement of said roller, but increases in magnitude in order that the moment of the counterweight may also have a constant increase. This is attained partly by placing the center of the sector 8 comparatively low with regard to the roller 1, partly by the bent form of the arm 11. (Indicated in the drawings.) The motion of the indicator-finger will be accelerated during the upward movement of the roller 12 between the first point of contact with the track, at which a line drawn from the center of the pivot about which the arm moves to the said point, is tangent to the curvature of the track and the second point of contact at which such a line is tangent. Beyond the second point of tangency the motion will be retarded. Notwithstanding the aforesaid irregularity of the movement of the roller the indicator-finger may thus be made to move uniformly. The lines of the indicator-dial will then be placed at equal intervals. It may, however, often be desirable to have the indicator-dial otherwise arranged—for instance, with great intervals at the beginning of the dial in order to have room for other lines indicating small units of weight when the movement of the indicator-finger is adjusted to match. In order to make it possible to adjust the movement of the indicator-finger at a certain point or part of the indicator-dial, a number of adjusting-screws 13 are screwed through the arm, said screws being placed at so short intervals as to form a nearly-continuous track or rolling path. If for a known load placed upon the platform an adjustment is found to be necessary, the screws 13 need only be screwed in or out at the point of contact between the roller and the arm until the finger indicates the proper weight. In this manner the weighing apparatus can be adjusted for each separate line of the indicator-dial. Instead of screws or pins other suitable means may be used.

A modification which may be substituted for the screws consists in that a plurality of thin eccentric disks 14 are placed upon the arm, Figs. 3 and 4, and jammed together by means of a thumb-nut. By somewhat loosening the latter and turning the disks the curvature of the track for the roller 12 may be changed as desired, whereupon the nut is tightened again. Thin disks with oblong slots embracing the arm, Fig. 5, so that the disks can be adjusted perpendicularly to the arm, could also be used. Finally it is to be noted that the gear or parts through which the arm 11 actuates the indicator-finger can be arranged in various ways. The position of the stud 12 upon the roller 4 can be another than that shown in Fig. 1—for instance, such as shown in Fig. 6, where it is attached nearer to the edge of the roller. The same figure also shows that the arm 11 can at the same time serve as an indicator-finger.

Having now described my invention, what I claim as new, and desire to secure by Letters Patent, is—

1. In automatic weighing apparatus of the class specified, the combination of the band 6 to be actuated by the load, the band-roller 1, around which the band is wound, the guides 2 for the roller 1, an arm 11, an indicator adapted to be operated by the arm, a roller 12 connected with the roller 1 for engaging said arm 11 and adjusting means on the arm 11, substantially as described.

2. In automatic weighing apparatus of the class specified the combination of the band to be actuated by the load, the roller 1 around which the band is wound, the roller 12, by means of which the roller 1 acts upon the pivoted arm 11 connected to the indicator-finger, adjusting means on the arm 11 forming an adjustable track for the roller 12, in order that the movement of the finger may be capable of adjustment.

3. In automatic weighing apparatus of the class specified the combination of the band to be actuated by the load, the band-roller 1, the arm 11 which is turned by the roller, when the band is stretched, and acting by gearing 8, 9 upon the indicator-finger, and an adjusting device placed on the arm 11, said adjusting device being arranged in such a manner that the track on the arm upon which the roller acts can be adjusted to impart the desired movement or turn of the finger, substantially as set forth.

In witness whereof I have hereunto signed my name in the presence of two subscribing witnesses.

KARL VICTOR BERGLUND.

Witnesses:
 ERNST SVANQVIST,
 A. F. LUNDBORG.

It is hereby certified that the name of the assignee in Letters Patent No. 727,268, granted May 5, 1903, upon the application of Karl Victor Berglund, of Stockholm, Sweden, for an improvement in "Automatic Weighing Apparatus," was erroneously written and printed "Vägfabriks Aktiebolaget Stathmos," whereas said name should have been written and printed *Vågfabriks Aktiebolaget Stathmos;* and that the said Letters Patent should be read with this correction therein that the same may conform to the record of the case in the Patent Office.

Signed and sealed this 14th day of July, A. D., 1903.

[SEAL.]

E. B. MOORE,
*Acting Commissioner of Patents.*